(12) United States Patent
Koto et al.

(10) Patent No.: US 7,072,470 B2
(45) Date of Patent: Jul. 4, 2006

(54) VIDEO SCRAMBLE/DESCRAMBLE APPARATUS

(75) Inventors: Shinichiro Koto, Kawasaki (JP); Tadaaki Masuda, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/715,406

(22) Filed: Nov. 19, 2003

(65) Prior Publication Data

US 2004/0101137 A1 May 27, 2004

Related U.S. Application Data

(63) Continuation of application No. 09/372,145, filed on Aug. 11, 1999, now Pat. No. 6,671,376.

(30) Foreign Application Priority Data

Aug. 12, 1998 (JP) ............................. 10-228053

(51) Int. Cl.
*H04L 9/00* (2006.01)
*H04N 7/167* (2006.01)

(52) U.S. Cl. .................... 380/210; 380/37; 380/219; 713/176

(58) Field of Classification Search ............... 713/175, 713/176; 380/210
See application file for complete search history.

(56) References Cited

U.S. PATENT DOCUMENTS

| 5,506,903 | A | * | 4/1996 | Yamashita ................ 380/216 |
| 5,887,061 | A | | 3/1999 | Sato |
| 6,061,451 | A | * | 5/2000 | Muratani et al. ........... 380/201 |
| 6,157,330 | A | | 12/2000 | Bruekers et al. |
| 6,285,774 | B1 | * | 9/2001 | Schumann et al. ......... 382/100 |
| 6,598,162 | B1 | * | 7/2003 | Moskowitz ................ 713/176 |
| 6,671,376 | B1 | * | 12/2003 | Koto et al. ................ 380/210 |
| 6,765,931 | B1 | * | 7/2004 | Rabenko et al. ........... 370/493 |
| 6,792,542 | B1 | * | 9/2004 | Lee et al. ..................... 726/1 |

FOREIGN PATENT DOCUMENTS

| JP | 9-298735 | 11/1997 |
| JP | 10-13827 | 1/1998 |
| JP | 10-13828 | 1/1998 |

* cited by examiner

*Primary Examiner*—Kambiz Zand
(74) *Attorney, Agent, or Firm*—Oblon, Spivak, McClelland, Maier & Neustadt, P.C.

(57) ABSTRACT

A video scramble apparatus has a scrambler for scrambling an input video signal, and a video encoder for performing interframe predictive coding of the video signal after scrambling, and the scrambler selects a frame, which is not used as a reference frame for interframe prediction in the video encoder, from the input video signal, and scrambles the frame by pixel replacing in units of slices within a predetermined vertical range or pixel replacing in units of n consecutive macroblocks within a predetermined horizontal range.

6 Claims, 11 Drawing Sheets

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | ... |
|---|---|---|---|---|---|---|---|---|----|----|----|----|----|----|----|----|----|----|----|----|----|----|----|----|----|-----|
| 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | ... |

FIG. 16B

| 46 | 47 | 48 | 53 | 54 | 55 | 49 | 50 | 51 | 52 | 59 | 60 | 61 | 62 | 56 | 57 | 58 | 63 | 64 | 65 | 66 | 67 | 68 | 69 | 70 | 71 | ... |
|---|---|---|---|---|---|---|---|---|---|---|---|---|---|---|---|---|---|---|---|---|---|---|---|---|---|---|
| 3 | 4 | 5 | 6 | 1 | 2 | 7 | 8 | 9 | 10 | 11 | 12 | 16 | 17 | 18 | 19 | 13 | 14 | 15 | 20 | 21 | 22 | 23 | 24 | 27 | 28 | ... |

VIDEO SCRAMBLE/DESCRAMBLE APPARATUS

CROSS-REFERENCE TO RELATED APPLICATIONS

This application is a continuation of U.S. patent application Ser. No. 09/372,145, filed Aug. 11, 1999, now U.S. Pat. No. 6,671,376, the entire contents of which are hereby incorporated herein by reference.

BACKGROUND OF THE INVENTION

The present invention relates to a video scramble/descramble apparatus corresponding to motion predictive/orthogonal transform coding of videos.

Various encryption techniques have been studied and developed to prevent unauthorized duplication and unauthorized access for the purpose of protecting the copyrights of products containing audio or video information.

For example, in a DVD (Digital Versatile Disc) using MPEG2 video coding, reconstruction regions are limited by region codes, and coded data is encrypted by a CSS (Contents Scrambling System).

As a scramble technique for a baseband video signal, techniques called line rotation which randomly sets one cut point per line and replacing the right and left line sections of the cut point and line permutation for randomly replacing scan lines are known. Line rotation is used to limit access in cooperation with a billing system as a scramble technique for pay-per-view programs for satellite broadcast and CATV (cable television).

For the purpose of preventing unauthorized duplication by consumer analog video tape recorders, a copy protection technique (Microvision Corporation) is known. In this technique, AGC signals or color stripe signals in the vertical blanking interval are manipulated to disable normal recording of copy-protected tape contents by the VTRS, although such copy-protected tape contents can be normally displayed on a TV.

Furthermore, a technique called "digital watermarking" corresponding to digital contents including audio or video information is known. Digital watermarking embeds data, which cannot be visually or aurally perceived, in a baseband signal or coded data of audio or picture data, or the like. Information to be hidden by digital watermarking includes, for example, copyright information, copy generation management information, playback control information, scramble key information, and the like.

The aforementioned techniques have both merits and demerits. For example, management using region codes unconditionally allows playback in designated regions, and data encryption by a CSS or the like does not inhibit playback using an authorized player. Hence, the region code or CSS can prevent coded data itself from being duplicated, but cannot prevent unauthorized duplication of a decoded video signal. On the other hand, the duplication protection system for analog VTRs depends on models of VTRs, and cannot always assure the duplication protection effect. In addition, since only sync signals are manipulated, resistance against unauthorized attacks is not always high. Furthermore, hiding of copyright information by, e.g., digital watermarking does not always technically limit prevention of unauthorized duplication of a video signal.

More specifically, in order to prevent unauthorized duplication of a video signal, more robust copyright protection method for the video signal itself must be used. However, when a conventional video scramble technique such as line rotation or the like is used, if the scrambled video signal is coded by MPEG2 which is used in a DVD or digital broadcast, the coding efficiency lowers compared to coding of a non-scrambled picture, thus deteriorating the picture quality of the reconstructed picture. This is because the conventional video scramble makes an original video picture hard to discern by lowering temporal spatial correlation of the picture by random manipulation of the picture, and is contradictory to motion predictive/orthogonal transform coding such as MPEG2 or the like, that improves coding efficiency using the temporal spatial correlation of a picture.

This point will be described in more detail below.

MPEG2 coding uses correlation of a video signal in the space domain (intraframe correlation) and correlation in the time domain (interframe correlation), and compresses the data size by removing redundancy in both these domains. Motion prediction in units of blocks anticipates an effect of reducing video signal power using interframe correlation. To reduce the data size by the DCT (discrete cosine transform) and variable-length coding in consideration of correlation between neighboring pixels in a frame and also quantization with weights depending on frequency in consideration of the nature of human vision, or to variable-length code only the difference between DC components of neighboring blocks anticipate reduction of video signal power using intraframe correlation.

Furthermore, upon coding motion vector information in units of macroblocks, the difference between the motion vectors of neighboring macroblocks is variable-length coded as a motion vector to be coded in consideration of motion similarity between frames in association with neighboring macroblocks. In this manner, the information size to be transmitted can be reduced.

However, in the conventional video scramble technique, correlation is lowered or video contents are made hard to recognize by random manipulations for the video signal. When a video signal that has undergone processes such as conventional line rotation, line permutation, or the like is coded by MPEG2, interline correlation in a frame considerably lowers, and a reduction of signal power can no longer be expected in a combination of DCT and variable-length coding.

When vertical motion components exist in the time domain, even when an original video picture has predictive efficiency in motion prediction in units of macroblocks, the similarity between a reference picture and picture to be coded lowers as a result of scrambling, and the predictive efficiency considerably drops. More specifically, the correlation of a video signal expected in MPEG2 coding considerably lowers, and it consequently becomes hard to reduce video signal power. In order to achieve coding at a predetermined bit rate, the number of coded bits must be reduced by coarse quantization, resulting in drop of image quality of the decoded picture.

As described above, as robust copyright protection method for a video signal, a scramble process for a video signal itself is effective. However, when the conventional video scramble technique is combined with coding such as MPEG2 that uses temporal spatial correlation, the coding efficiently suffers, resulting in deterioration of image quality of the reconstructed picture.

BRIEF SUMMARY OF THE INVENTION

It is an object of the present invention to provide a video scramble apparatus and video descramble apparatus, which are free from deterioration of image quality even in coding as a combination of motion predictive and orthogonal transform like MPEG2 coding.

It is another object of the present invention to provide a video scramble apparatus which can implement video scramble that can minimize coding efficiency drop and can maintain high image quality by selecting a frame which is not used as a reference picture in interpicture predictive coding, i.e., interfield or interframe predictive coding and scrambling the selected frame using one or both of pixel replacing in units of m slices in a predetermined vertical range or pixel replacing in units of n consecutive macroblocks within a predetermined horizontal range.

According to the first aspect of the present invention, there is provided a video scramble apparatus comprising a scramble unit which scrambles a video signal, and a coding unit which performs interpicture predictive coding of the video signal scrambled by the scramble unit, wherein the scramble unit selects a picture, which is not used as a reference picture for interpicture prediction in the coding unit, from the video picture signal, and replaces slices as sets of macroblocks located on identical scan lines in the video picture signal of the selected picture in units of m slices which are consecutive in a vertical direction in the picture.

In MPEG2 coding, a picture which is not used as a reference picture means all B-pictures (bi-directional predictive coded pictures), I-pictures (interframe coded pictures) which are not referred to from other frames, and P-pictures (forward predictive coded pictures) which are not referred to from other frames.

Since the video scramble apparatus implements scrambling by replacing only a picture which is not used as a reference picture of interframe predictive coding in units of slices in the vertical direction, a predictive signal of a coded macroblock can be extracted from an appropriate position of the reference picture like in normal coding, thus preventing motion predictive efficiency drop.

Since in MPEG2 coding intraframe correlation is used only in a block and only between blocks in a slice, the intraframe correlation never lowers. Furthermore, upon motion vector coding, since differences are coded in units of neighboring macroblocks in a slice except for the head position of the slice, the motion vector differences become constant irrespective of the presence/absence of scrambling except for the head position of the slice, and the number of coded bits of motion vector data can be prevented from increasing.

In MPEG2 coding, the variable-length coding scheme upon coding motion vector data is determined based on the maximum values of horizontal and vertical components of motion vectors in the frame, and as the maximum values become larger, the code length increases. Hence, when slices are replaced arbitrarily, the maximum value of vertical components of motion vectors increases, and the number of coded bits of motion vector data increases. However, upon replacing a predetermined number of slices within a group including these slices, an increase in vertical component of the motion vector can be suppressed to be equal to or smaller than a predetermined value, and the number of coded bits of motion vector data can be minimized. Upon replacing slices, when motion vectors with respect to a reference picture are detected from macroblocks in the replaced slice, motion vectors are preferably found by search from a broad range in the vertical direction in correspondence with an increase in motion amount corresponding to replacement of slices.

According to the second aspect of the present invention, there is provided a video scramble apparatus comprising a coding unit which performs inter-picture predictive coding of a video signal, and outputting first coded video data; and a scramble unit which scrambles the first coded video data output from the coding unit, wherein the scramble unit selects second coded video data corresponding to a picture, which is not used as a reference picture for inter-picture prediction in the coding unit, from the first coded video data, and replaces the selected second coded video data corresponding to slices in units of m slices which are consecutive in a vertical direction in the picture, the slices being sets of macroblocks located on an identical scan line.

In this manner, in the video scramble apparatus of the second aspect, after video coding for the input video, e.g., MPEG2 coding, slices in a frame are replaced on the level of coded data as in the video scramble apparatus of the first aspect, thus obtaining coded video data which has undergone scrambling equivalent to that by the video scramble apparatus of the first aspect. In this case, the motion vector search range need not be broadened upon scrambling, and a motion vector search can be made within a normal search range.

According to the third aspect of the present invention, there is provided a video scramble apparatus comprising a coding unit which performs inter-picture predictive coding of a video signal, and outputting first coded video data; and a scramble unit which scrambles the first coded video data output from the coding unit, wherein the scramble unit selects second coded video data corresponding to a picture, which is not used as a reference picture for inter-picture prediction in the coding unit, from the first coded video data, and replaces the selected second coded video data corresponding to slices in units of m slices which are consecutive in a vertical direction in the picture, the slices being sets of macroblocks located on an identical scan line, and the scramble section includes a multiplexer which adds an offset to a vertical component of a motion vector of each of the macroblocks constituting the slices in accordance with the replacement of the coded video data and multiplexes an added result to the coded video data.

More specifically, in the video scramble apparatus of the third aspect, offset addition to the vertical component of a motion vector of each macroblock is added to the scramble unit in the video scramble apparatus of the second aspect.

The video scramble apparatus of the third aspect can obtain the following effects in addition to the same effects as those of the video scramble apparatus of the second aspect. More specifically, in combination with replacement of coded data in units of slices, for only a macroblock such as a first macroblock of each slice, which is coded without coding the difference between motion vectors, coded data of that motion vector is replaced by coded data of a motion vector added with a vertical offset upon replacing slices. In this manner, video scrambling equivalent to that in the video scramble apparatus of the first aspect can be implemented by only processes for coded data obtained by directly using a conventional video coding system.

According to the fourth aspect of the present invention, there is provided a video scramble apparatus comprising a scramble unit which scrambles a video signal, and a coding unit which performs interframe predictive coding of the video signal scrambled by the scramble unit, wherein the scramble unit selects a picture, which is not used as a reference picture for inter-picture prediction in the coding unit, from the video signal, performs first division of macroblocks located on an identical scan line in the video signal of the selected picture in units of m consecutive macroblocks, performs second division in units of n consecutive macroblocks (n<m) within the m consecutive macroblocks obtained by the first division, and replaces macroblocks in units of n consecutive macroblocks obtained by the second division within the m consecutive macroblocks obtained by the first division.

When scrambling is to be done by replacing macroblocks in the horizontal direction in an identical slice in a frame which is not used as a reference picture, the motion vector values and difference values between neighboring macroblocks upon replacing macroblocks become large, as described above, and as a consequence, the picture quality may often deteriorate due to coding efficiency drop. Especially, when macroblocks are randomly replaced, the effect of calculating the difference between the motion vectors of neighboring macroblocks is lost, and the offset of the motion vector increases to a value around the horizontal size of the screen at maximum.

By contrast, the video scramble apparatus according to the fourth aspect performs first division in units of m macroblocks, which succeed in the horizontal direction, performs second division for further dividing each of macroblock groups obtained by the first division in units of n consecutive macroblocks (m>n), and replaces macroblocks in units of n macroblocks obtained by the second division within each macroblock group obtained by the first division. In this manner, the offset to be added to the horizontal motion vector of each macroblock upon replacing macroblocks is limited by the first division size.

As for the difference between horizontal motion vectors of neighboring macroblocks, the difference normally increases at the head of the set of macroblocks obtained by the second division, but does not increase at positions other than the head of the second division. More specifically, according to the video scramble apparatus of the fourth aspect, video scrambling can be implemented by replacement of horizontal macroblock sets without considerable drop of coding efficiency (deterioration of image quality of the reconstructed picture) by suppressing an increase in the number of coded bits of motion vector data in MPEG2 coding.

According to the fifth aspect of the present invention, there is provided a video scramble apparatus comprising a coding unit which performs inter-picture predictive coding of a video signal, and outputting first coded video data, and a scramble unit which scrambles the first coded video data output from the coding unit, wherein the scramble unit selects second coded video data corresponding to a frame, which is not used as a reference picture for inter-picture prediction in the coding unit, from the coded video data, performs first division of macroblocks located on an identical scan line in the selected second coded video data in units of m macroblocks, performs second division of macroblocks in units of n macroblocks (n<m) within the m macroblocks obtained by the first division, and replaces the second coded video data corresponding to macroblocks in units of n macroblocks obtained by the second division.

According to the video scramble apparatus of the fifth aspect, after, for example, MPEG2 coding is done using a video signal before scrambling as in the video scramble apparatuses of the second and third aspects, macroblocks are replaced on the level of coded data, thus obtaining coded video data that has been scrambled.

According to the sixth aspect of the present invention, there is provided a video scramble apparatus comprising a coding unit which performs inter-picture predictive coding of a video signal, and outputting first coded video data, and a scramble unit which scrambles the first coded video data output from the coding unit, wherein the scramble unit selects a picture, which is not used as a reference picture for inter-picture prediction in the coding unit, from the video signal, performs first division of macroblocks located on an identical scan line in the video signal of the selected picture in units of m consecutive macroblocks, performs second division in units of n consecutive macroblocks (n<m) within the m consecutive macroblocks obtained by the first division, and replaces macroblocks in units of n consecutive macroblocks obtained by the second division within the m consecutive macroblocks obtained by the first division, and the scramble unit includes a multiplexer which adds an offset to a horizontal component of a motion vector of each of the macroblocks in accordance with the replacement of the coded video data and multiplexes an added result to the coded video data.

In the video scramble apparatus according to the sixth aspect, offset addition to the horizontal component of a motion vector of each macroblock is added to the scramble unit in the video scramble apparatus according to the fifth aspect.

The video scramble apparatus according to the sixth aspect can obtain coded data that has undergone scrambling equivalent to that of the video scramble apparatus according to the fourth aspect by only processes for coded data, which is coded by a normal video coding system.

In a video scramble apparatus according to the seventh aspect of the present invention, at least one of video scramble apparatuses according to the first to third aspects is combined with at least one of video scramble apparatuses according to the fourth to sixth aspects.

Since replacement of slices in the vertical direction and replacing in units of n consecutive macroblocks in the horizontal direction are nearly free from coding efficiency drop, as described above, they may be combined to implement video scrambling as in the video scramble apparatus according to the seventh aspect. By combining these scramble schemes, more robust video scrambling can be implemented. That is, by increasing the number of scramble schemes to be combined, resistance against unauthorized attacks can be strengthened, and an effect of making an original video picture hard to recognize can be improved as scramble manipulations becomes more complicated.

By controlling horizontal and vertical scramble patterns or their combinations according to the present invention, resistance against unauthorized attacks and the way a picture looks can be controlled in correspondence with application's requests.

Video data scrambled by the video scramble apparatus of the present invention is sent to a transmission system. A storage medium may be used as a transmission system, scrambled video data may be recorded on that storage medium, and may be descrambled upon playback. A transmission line such as a terrestrial wave, satellite, cable, Internet, or the like may be used as a transmission system, and scrambled video data may be transmitted and descrambled in real time via such transmission system.

In a video scramble apparatus according to the eighth aspect of the present invention, the video scramble apparatus according to one of the first to seventh aspects further comprises a replacing pattern generator for generating a slice or macroblock replacing pattern for scrambling in the scramble unit, a descramble key generator for generating the replacing pattern or initial data for generating the replacing pattern as a descramble key, and a multiplexer for multiplexing the descramble key on at least one of video data to be coded by the coding unit, a video signal scrambled by the scramble unit, coded video data obtained by the coding unit, and audio data multiplexed with (or associated with) the encoded video data.

The replacing patterns of slices in the vertical direction and replacing patterns in units of n consecutive macroblocks in the horizontal direction may be determined based on random patterns generated by the scramble apparatus. When the random pattern itself, a random pattern generator, or its initial value is sent to an authorized receiver as a key for descrambling (descramble key; secret key), descrambling can be achieved on the receiving side.

The descramble key or a part of the descramble key can be sent via a route different from that of coded video data, e.g., via an IC card, telephone line, or the like. A part of the descramble key may be multiplexed on coded video data or audio data associated with that video data.

There are a case (1) that the descramble key itself is obtained by a path (IC card, internet and the like) different from that of the coded video data and a case (2) that in a transmission side, a part of construction elements of the key data is obtained by a path different from that of the coded video data and the remainder thereof is transmitted with being multiplexed with the coded video data, using the digital water marking, and in a receiver side the key is reconstructed by combining the part of the key data and the remainder thereof. In the cases, a part of the descramble key can be hidden in contents using the aforementioned digital watermarking technique. A part of the descramble key may be hidden in a video signal before or after scrambling using digital watermarking.

When the descramble key is hidden in the scrambled video signal, since descrambling is done after the key is detected, data can be descrambled without any delay time. When the key is hidden in a picture signal before scrambling, a key for the next scrambled picture is extracted from the descrambled picture signal to descramble that picture. In the former case, descramble key information disappears by descrambling, and any delay time between key detection and the descramble process can be minimized. Conversely, in the latter case, digital watermark information containing the descramble key remains even after descrambling and, for example, playback control information can be hidden in the picture signal together with the descramble key.

Note that the hidden descramble key must be that for a picture input after that key. These two schemes can be selectively used depending on applications.

A key for descrambling the scrambled video signal may be hidden in an audio signal associated with the video signal. Normally, a pair of video signal and audio signal are strictly synchronously played back. That is, even when the descramble key for a corresponding video signal is hidden in an audio signal, their relationship can be strictly saved, and the video signal can be normally descrambled.

In this manner, when some data of the descramble key are sent while being hidden in a video signal or audio signal, even when the scramble pattern, i.e., the descramble key is varied temporally, normal descrambling can be done without disturbing the relationship between the scramble pattern and descramble key. Also, by changing the key frequently in consecutive video signals, resilience against unauthorized attacks can be improved.

For example, of the descramble key, data which frequently change temporally may be hidden in a video or audio signal, and data fixed in units of, e.g., programs may be sent from a route such as an IC card, telephone line, or the like. When the descramble key is hidden using digital watermarking, a key that frequently changes temporally need not be set using blanking interval information of a video signal as a video signal or another signal route, and the interface between devices can be simplified.

A video descramble apparatus according to the present invention comprises a receiver unit for receiving coded video data coded and scrambled by a video scramble apparatus of any one the first to eighth aspects, a decoding unit for decoding the coded video data received by the receiver unit to obtain a video signal, a descramble unit for descrambling the video signal obtained by the decoding unit, and a descramble key extraction unit for extracting the descramble key from at least one of the coded video data received by the receiver unit, the video signal obtained by the decoding unit, the video signal output from the descramble unit, and audio data included in the coded video data, and the descramble unit descrambles the video signal obtained by the decoding unit using the descramble key extracted by the scramble key extraction unit.

In this manner, in the video scramble apparatus of the present invention, since a descramble key is detected, encoded video data is decoded, and the decoded data is descrambled on the basis of the scramble pattern determined by the detected descramble key to output a video signal, a normal video signal can be played back.

Even when an unauthorized receiver decodes coded video data, he or she can only obtain a scrambled video signal, thus protecting the copyright of the corresponding contents.

Furthermore, according to the present invention, there is provided a recording medium that records video data, which is coded and scrambled by one of the video scramble apparatuses according to the first to eighth aspects. Since video data coded and scrambled according to the present invention cannot be normally played back even if its unauthorized duplication can be made, the copyright can be protected even on the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 14A and 14B are views for explaining a video scramble method according to the ninth embodiment of the present invention;

FIGS. 15A and 15B are views for explaining a video scramble method according to the 10th embodiment of the present invention; and FIGS. 16A and 16B are views for explaining a video scramble method according to the 11th embodiment of the present invention.

DETAILED DESCRIPTION OF THE INVENTION

The preferred embodiments of the present invention will be described hereinafter with reference to the drawings.

Figure 1:
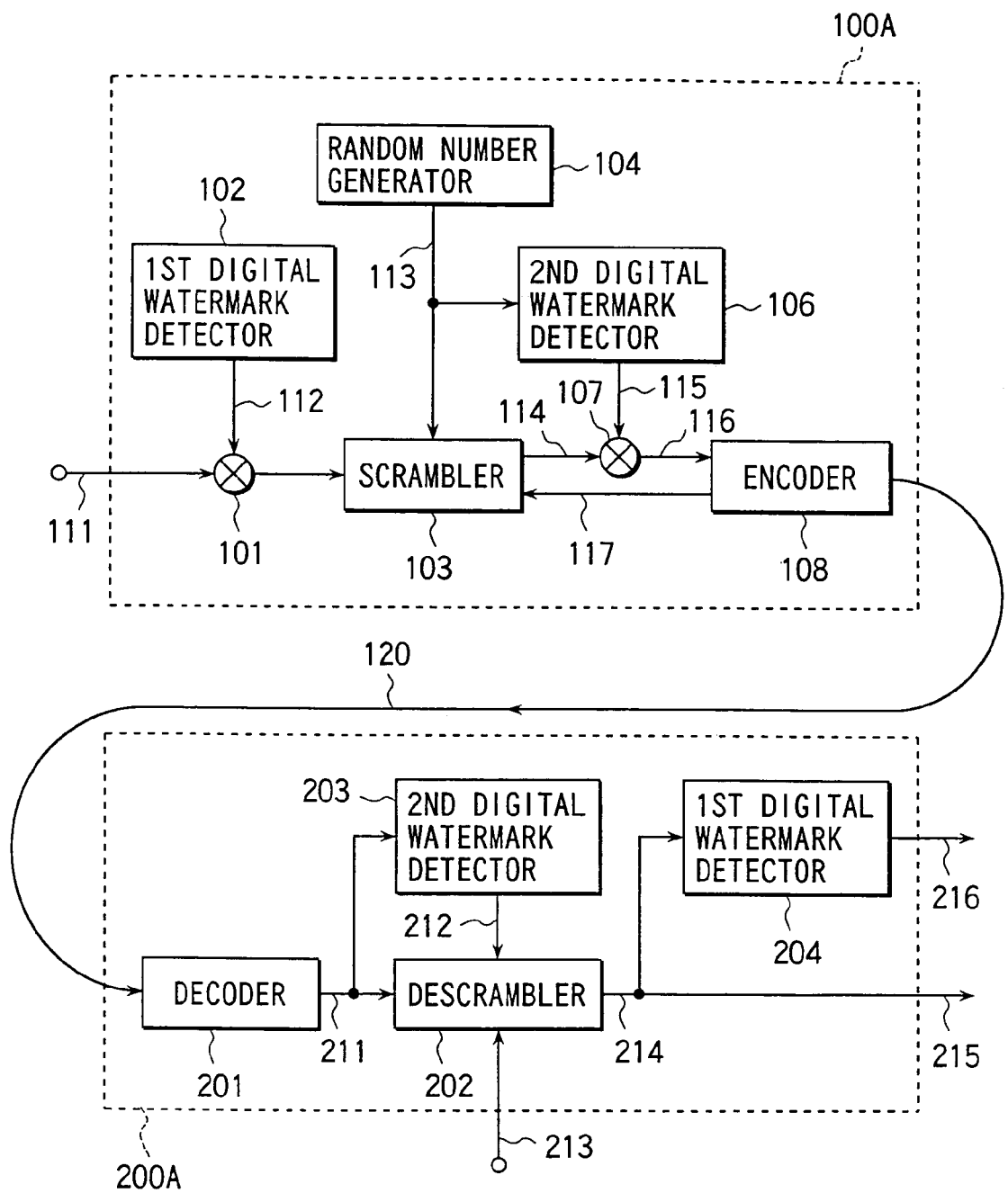
FIG. 1 is a block diagram of a video coding/decoding system according to the first embodiment of the present invention.

FIG. 1 shows the arrangement of a video coding/decoding system to which a video scramble/descramble apparatus according to the first embodiment of the present invention is applied. This video coding/decoding system complies with MPEG2 video specifications. The same applies to all the embodiments to be described hereinafter.

Referring to FIG. 1, a video coding system 100A comprises a digital watermark multiplexer 101, first digital watermark detector 102, scrambler 103, random number generator 104, second digital watermark detector 106, digital watermark multiplexer 107, and video encoder 108. On the other hand, a video decoding system 200A connected to the video coding system 100A via a transmission system 120 comprises a video decoder 201, descrambler 202, second digital watermark detector 203, and first digital watermark detector 204. Note that the transmission system 120 may be either of a broadcast/communication system such as a satellite, terrestrial wave, or the like, or a storage medium such as a DVD or the like.

The video coding system 100A will be explained first.

A digital watermark signal 112 generated by the first digital watermark detector 102 is multiplexed on a video signal (to be referred to as a video signal hereinafter) 111 input to the video coding system 100A by the digital watermark multiplexer 101, and the video signal 111 is then scrambled by the scrambler 103. The arrangement of the scrambler 103 and its practical scramble method will be described in detail later.

The digital watermark signal 112 contains copyright information, reconstruction or playback control information, and the like when such information need not be hidden, the digital watermark signal 112 need not be multiplexed on the video signal 111. The scramble pattern in the scrambler 103 is determined on the basis of scramble key information 113 generated by the random number generator 104 and video coding information 117 output from the video encoder 108.

The video coding information 117 contains information indicating one of coding picture types of the respective pictures, i.e., frames, that is, I-picture (intraframe coded picture), P-picture (forward predictive coded picture), and B-picture (bi-directional predictive coded picture). The scrambler 103 performs a video scramble process according to the present invention for a frame, which is not used as a reference picture on the basis of the video coding information 117.

Figure 10A:
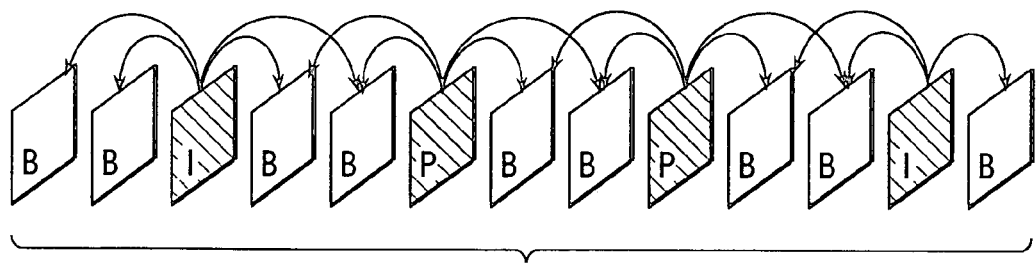
FIGS. 10A to 10C are views showing interframe predictive structures in MPEG2 coding.
Figure 10B:
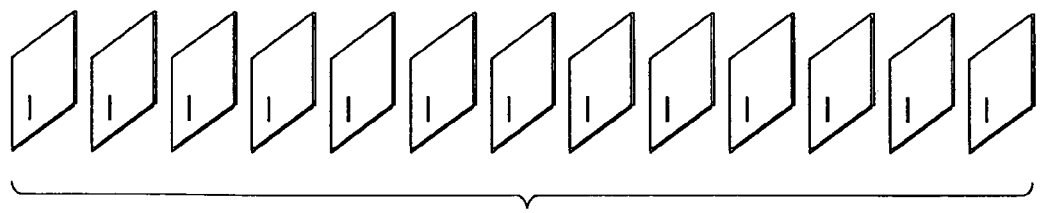
Figure 10C:
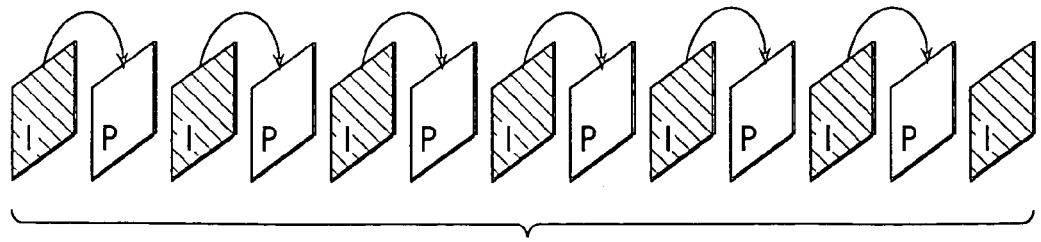

FIGS. 10A, 10B, and 10C show examples of the interframe predictive structures in MPEG2 coding. In these figures, the abscissa plots time, and the predictive structure between neighboring frames is indicated by an arrow from a reference picture to a picture to be coded. FIGS. 10A to 10C show different examples of predictive structures. A hatched frame in FIGS. 10A to 10C indicates a frame used as a reference picture. In FIG. 10A, since B-frames are not used as reference pictures, all B-frames are scrambled. In FIG. 10B, since all frames are I-frames, and interframe prediction is not used, all frames are scrambled. In FIG. 10C, since prediction using P-frames is not made, all P-frames are scrambled.

A digital watermark signal 115 generated by the second digital watermark detector 106 is multiplexed on a video signal 114 containing frames scrambled by the scrambler 103 by the digital watermark multiplexer 107, and a video signal 116 multiplexed with the digital watermark signal 115 is coded by the video encoder 108. The digital watermark signal 115 contains information that pertains to the scramble key information 113 from the random number generator 104. Coded video data output from the video encoder 108 is output onto the transmission system 120.

The video decoding system 200A will be explained below.

The video decoding system 200A receives the scrambled coded video data from the transmission system 120, and executes a normal video decoding process by the video decoder 201. A video signal 211 obtained by this decoding is scrambled. The second digital watermark detector 203 corresponding to the second digital watermark detector 106 detects scramble key information 212 from the scrambled video signal 211, and sends the detected key information to the descrambler 202.

The descrambler 202 reconstructs a descramble key on the basis of the scramble key information 212 and externally input second information 213 that pertains to the scramble key, and descrambles the video signal 211 output from the video decoder 201. The arrangement of the descrambler 202 will be described later.

Note that the second information 213 that pertains to the scramble key information is given to an authorized video coding system or user, and is hidden in the authorized video coding system or is given from an IC card or network as needed. In the latter case, the second information 213 is given in association with a billing system of, e.g., pay-per-view programs.

A video signal 214 descrambled by the descrambler 202 is output as an output signal 215 to be output to a video display device or recording device. When information such as copyright information, playback control information, or the like is multiplexed as a digital watermark on the video signal 214, the video signal 214 is input to the digital watermark detector 204 corresponding to the first digital watermark detector 102, and digital watermark information 216 is output. The digital watermark information 216 is used to specify a copyright holder, or used in video playback control, video recording control, or the like.

Figure 2:
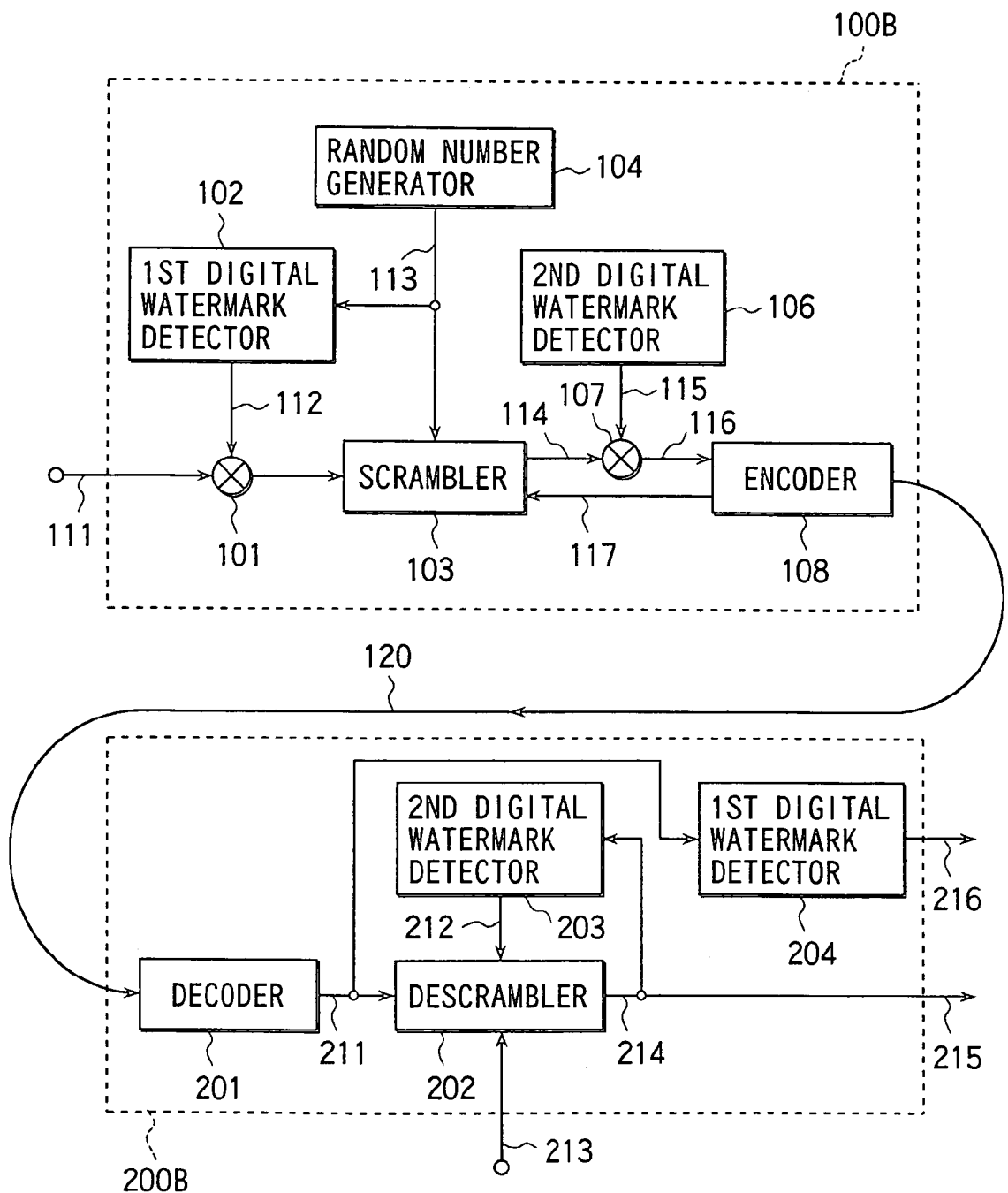
FIG. 2 is a block diagram of a video coding/decoding system according to the second embodiment of the present invention.

FIG. 2 shows a video coding/decoding system to which video scramble method and apparatus according to the second embodiment of the present invention are applied. The same reference numerals in FIG. 2 denotes the same parts as in FIG. 1, and the difference from the first embodiment will be mainly explained below. In this embodiment, the multiplexing method of scramble key information 113 in a video coding system 100B is different from the first embodiment.

That is, in the video coding system 100B of this embodiment, scramble key information 113 generated by a random number generator 104 is input to a digital watermark detector 102, and is multiplexed on a video signal 111 before scrambling as a digital watermark signal 112 by a digital watermark multiplexer 101.

On the other hand, in a video decoding system 200B, a digital watermark detector 203 detects scramble key information 212 from a video signal 214 reconstructed via a video decoder 201 and descrambler 202, and inputs the detected information to a descrambler 203 together with second information 213 that pertains to a scramble key.

That is, in the first embodiment shown in FIG. 1, detection of the scramble key information and descrambling form a feed-forward loop, and key information that pertains to a scrambled video frame can be multiplexed on the scrambled picture itself. However, in the second embodiment shown in FIG. 2, detection of the scramble key information and descrambling form a feedback loop, and multiplexing and detection by means of digital watermarking are done in advance for scramble key information for a following video frame.

In this embodiment, information such as playback control information or the like, which is not associated with scrambling, can be multiplexed on a scrambled video signal 114 in addition to the digital watermark signal 115 generated by the digital watermark detector 106 in the video coding system 10A. In the video decoding system 200B, such digital watermark information is detected from a scrambled video signal 211, decoded by the video decoder 201, by a digital watermark detector 204, and the scrambled video signal 211 is descrambled by the descrambler 203 later.

As described above, according to this embodiment, digital watermark information such as playback control information or the like can be automatically erased by descrambling. On the other hand, in the first embodiment, since copyright information, playback control information, or the like is multiplexed as a digital watermark on a signal before scrambling, that information is saved even after decoding by the decoder and descrambling. The individual features of the first embodiments can be selectively used in correspondence with application requests.

Figure 3:
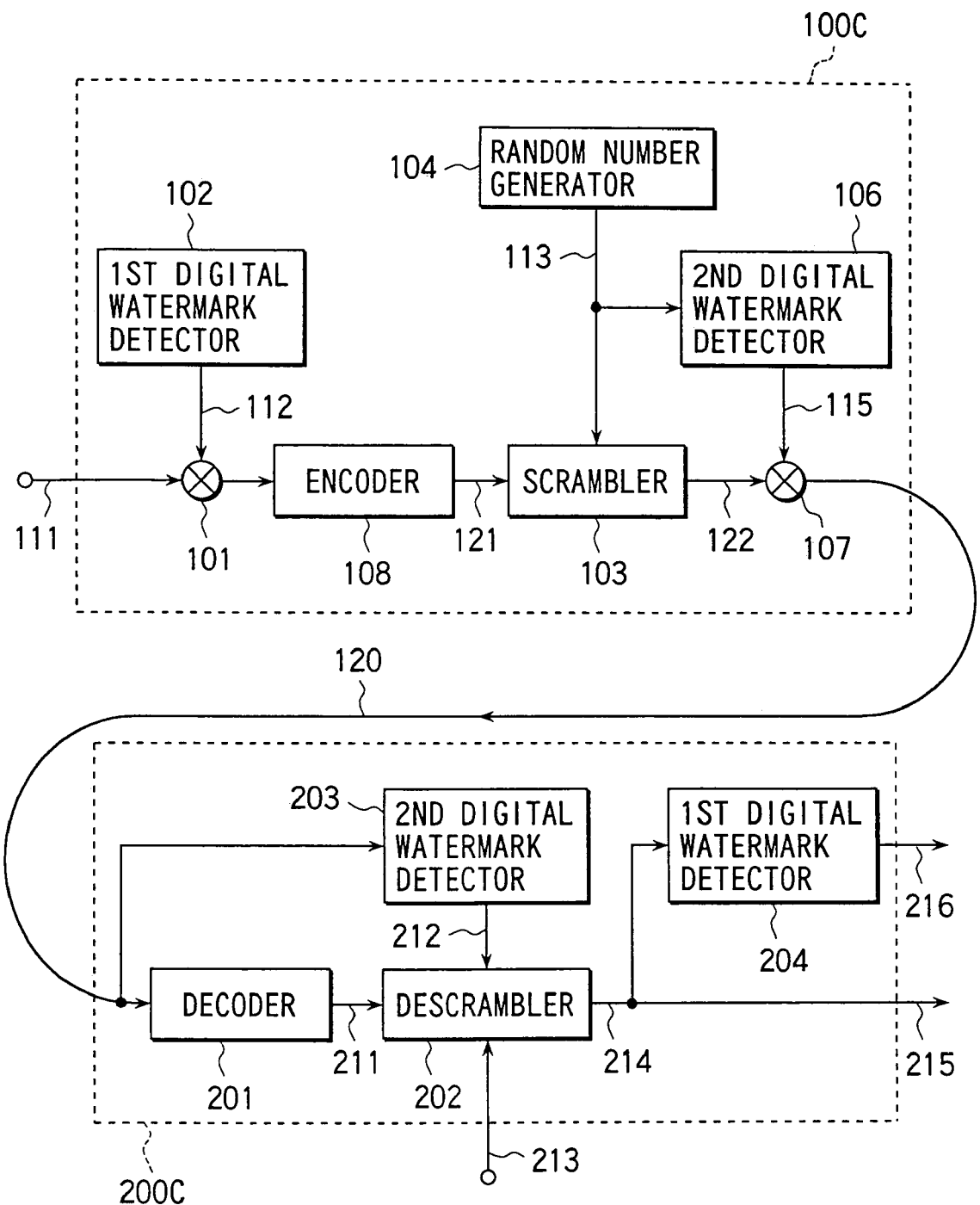
FIG. 3 is a block diagram of a video coding/decoding system according to the third embodiment of the present invention.

FIG. 3 shows the arrangement of a video coding/decoding system using video scramble method and apparatus according to the third embodiment of the present invention.

The same reference numerals denote the same parts as those in FIGS. 1 and 2, and the difference from the first and second embodiments will be mainly explained below. In this embodiment, in a video coding system 100C, a digital watermark signal 112 containing, e.g., copyright information, playback control information, and the like from a digital watermark detector 102 is multiplexed on an input video signal 111 by a digital watermark multiplexer 101, and the video signal multiplexed with the digital watermark signal 112 is coded by a video encoder 108. Coded video data 121 output from the video encoder 108 is scrambled by a scrambler 103.

More specifically, in the first and second embodiments, the input video signal 111 is scrambled first, and is then coded, while in this embodiment, the input video signal 111 is coded by the video encoder 108 first, and is then scrambled by the scrambler 103.

Scramble key information 113 generated by a random number generator 104 is input to a second digital watermark detector 106, and is multiplexed as a digital watermark signal 115 on scrambled coded video data 122 by a digital watermark multiplexer 107.

On the other hand, in a video decoding system 200C, the received, scrambled coded video data is decoded by a video decoder 201, and a second digital watermark detector 203 detects scramble key information 212 from the received coded video data.

A video signal 211 decoded by the video decoder 201 is input to a descrambler 202 together with the scramble key information 212 detected by the digital watermark detector 203, and second information 213 that pertains to a scramble key, and is descrambled. A descrambled video signal 214 is output as an output signal 215 to be output to a video display device or recording device, and is input to a first digital watermark detector 204 to output digital watermark information 216 such as copyright information, playback control information, or the like.

In this embodiment, although the video coding system 100C scrambles the coded video data 121, the video decoding system 200C can play back a picture by descrambling a video signal which is obtained by decoding the scrambled coded video data without descrambling it.

In scrambling such as CSS or the like for normal coded data, descrambling is done before the video decoder, and the picture obtained by decoding is a normal one. However, according to this embodiment, since both the coded video data and decoded video signal are scrambled, the copyrights of both the signals can be protected.

Furthermore, according to this embodiment, since the scrambler 103 scrambles the coded video data 121 obtained by coding the input video signal 111 by the video encoder 108, the motion vector search range need not be broadened upon scrambling, and a motion vector search can be made within a normal search range. Hence, performance equivalent to a normal video coding system can be obtained in terms of motion vector detection.

Since the scrambler 103 scrambles the compressed, coded video data 121, the processing speed can be lowered in accordance with the compression ratio unlike scrambling for the input video signal 111 in the first and second embodiments.

Figure 4:
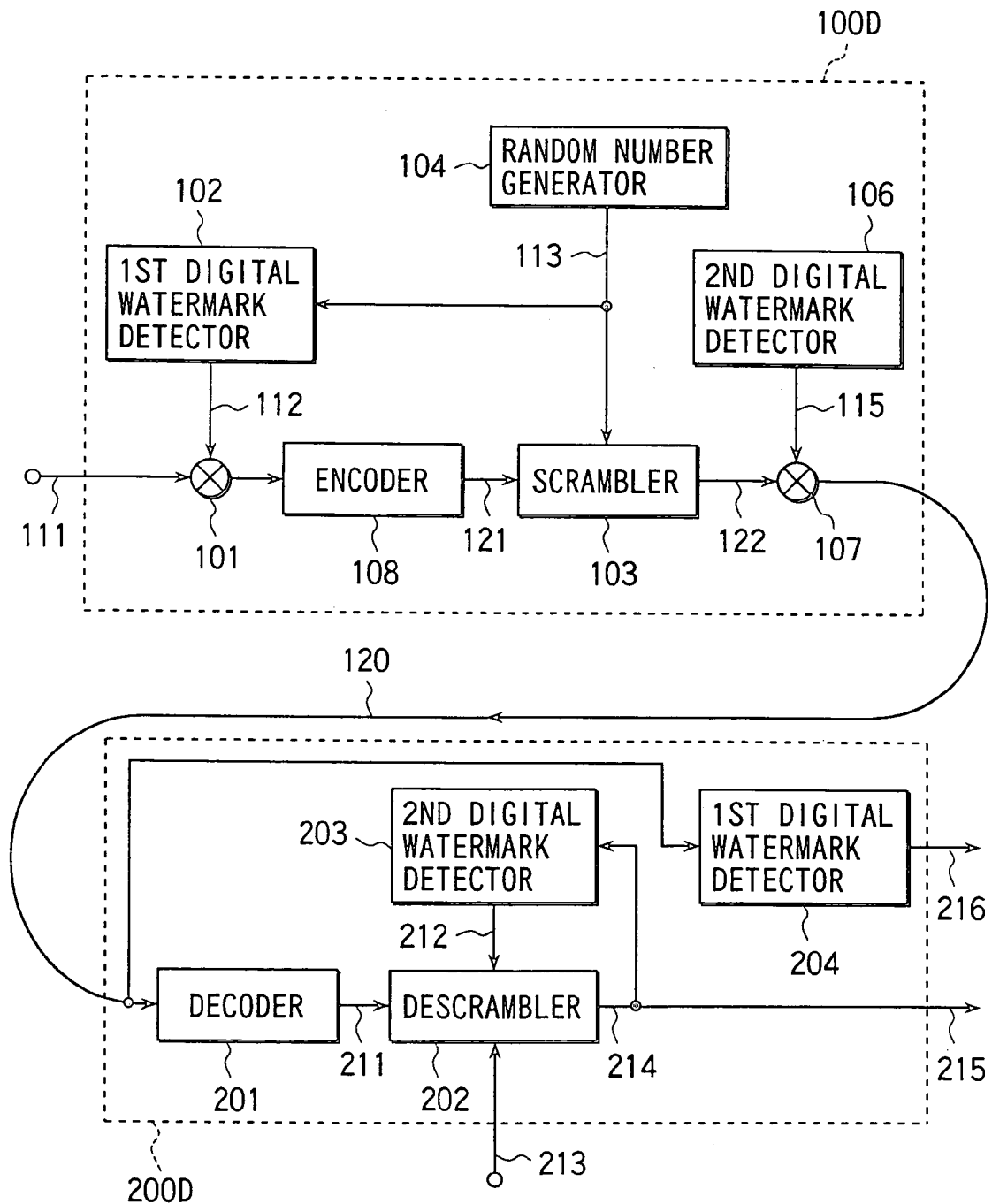
FIG. 4 is a block diagram of a video coding/decoding system according to the fourth embodiment of the present invention.

FIG. 4 shows the arrangement of a video coding/decoding system which uses a video scramble/descramble apparatus according to the fourth embodiment of the present invention.

The difference between this embodiment and the third embodiment shown in FIG. 4 lies in that scramble key information 113 generated by a random number generator 104 is input to a digital watermark detector 102, and is multiplexed as a digital watermark signal 112 on an input video signal 111 by a digital watermark multiplexer 101 in a video coding system 100D.

On the other hand, in a video decoding system 200D, a digital watermark detector 203 detects a descramble key 212 from a video signal 214, which is obtained by descrambling a video signal 211, decoded by a video decoder 201, by a descrambler 202, and inputs the key to the descrambler 202 together with second information 213 that pertains to a scramble key.

Figure 5:
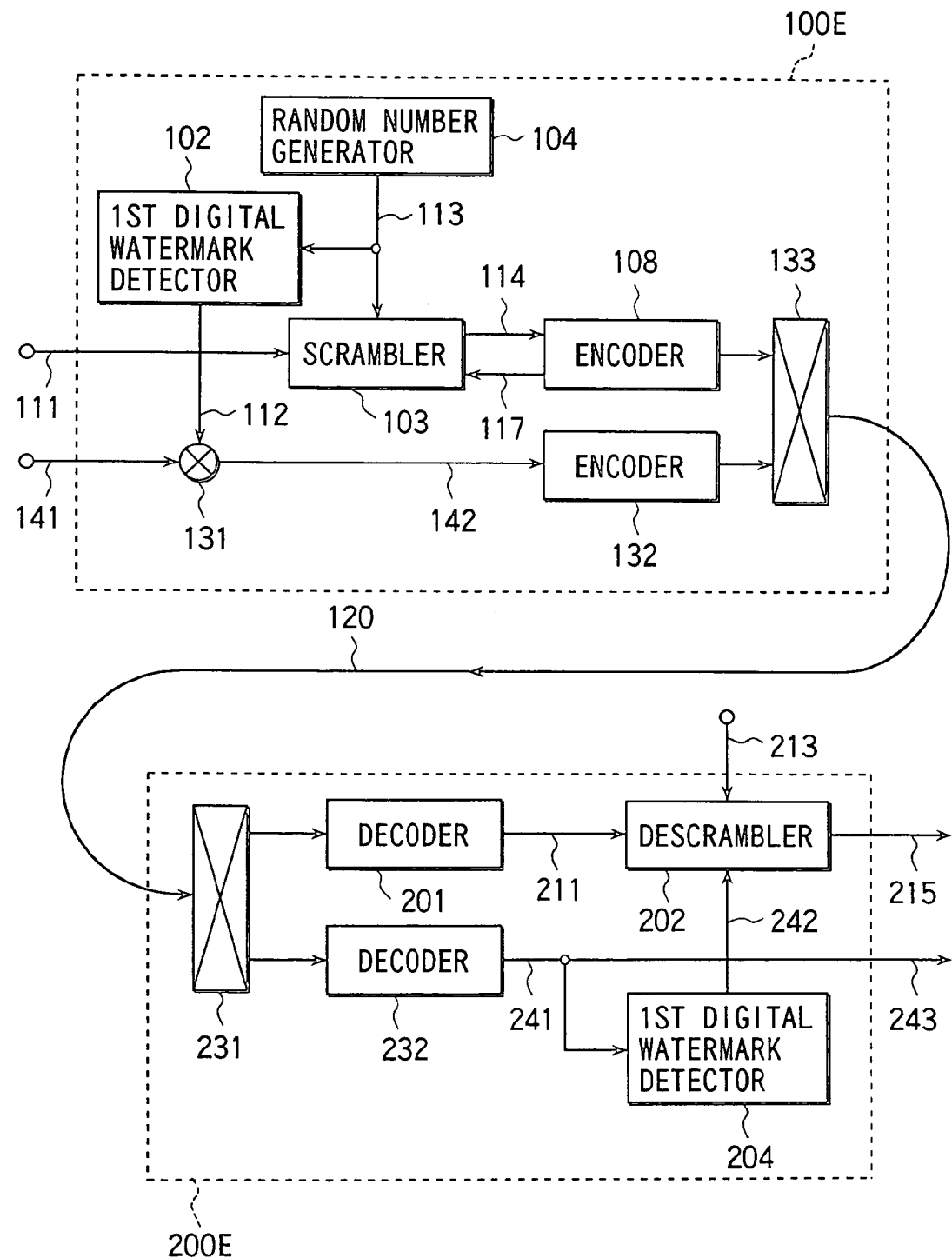
FIG. 5 is a block diagram of a video coding/decoding system according to the fifth embodiment of the present invention.

FIG. 5 shows the arrangement of a video coding/decoding system which uses a video scramble/descramble apparatus according to the fifth embodiment of the present invention.

In this embodiment, in a video coding system 100E, a scrambler 103 scrambles an input video signal 111, a video encoder 108 codes a scrambled video signal 114, and an audio encoder 132 codes an input audio signal 141 associated with the input video signal 111. The coded video data output from the video encoder 108 and coded audio data output from the audio encoder 132 are multiplexed by a multiplexer 133, and the multiplexed data is output onto a transmission system 120.

On the other hand, in a video decoding system 200E, a demultiplexer 231 demultiplexes the coded video and audio data from the received coded data, and these coded video and audio data are respectively decoded by a video decoder 201 and audio decoder 232. A decoded video signal 211 output from the video decoder 201 is descrambled by a descrambler 202, and a descrambled video signal 215 is output together with an audio signal 243 decoded by the audio decoder 232.

In the video coding system 100E, a digital watermark signal 112 containing scramble key information 113 for a video signal is generated by a digital watermark detector 102, and is multiplexed on the input audio signal 141 associated with the input video signal 111 by a digital watermark multiplexer 131. In the video decoding system 200E, a digital watermark detector 204 detects scramble key information 242 for a video signal, which was multiplexed by digital watermarking, from the decoded audio signal 241, and that information is input to the descrambler 202 together with second information 213 that pertains to a scramble key.

Figure 6:
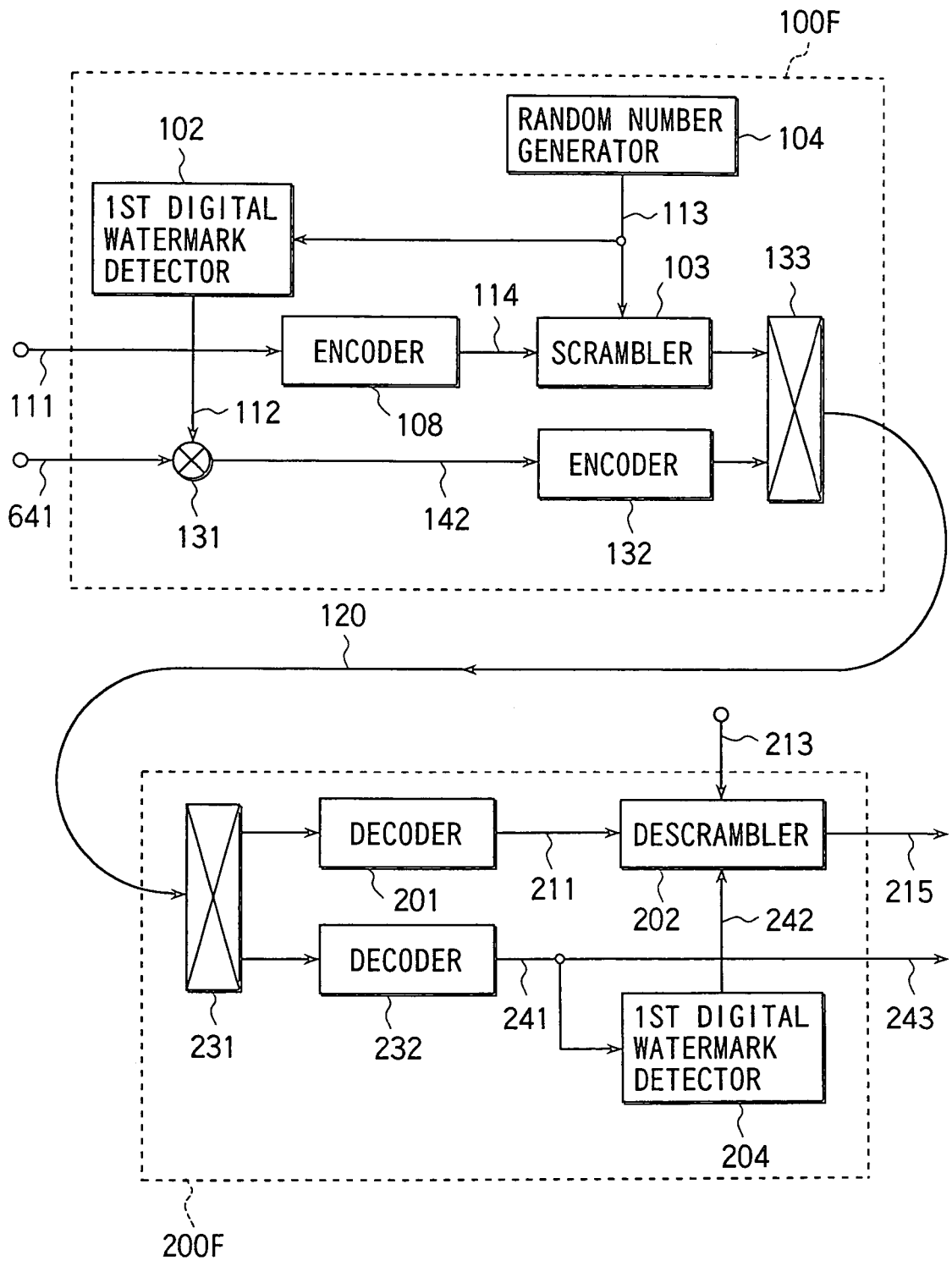
FIG. 6 is a block diagram of a video coding/decoding system according to the sixth embodiment of the present invention.

FIG. 6 shows the arrangement of a video coding/decoding system which uses a video scramble/descramble apparatus according to the sixth embodiment of the present invention.

In this embodiment, the order of a scrambler 103 and video encoder 108 in a video coding system 100F is opposite to that in the fifth embodiment shown in FIG. 5, and the arrangement of a video decoding system 200F is the same as that of the video decoding system 200E shown in FIG. 5.

The arrangement of a scrambler for a video signal in the embodiments of the present invention will be described below.

Figure 7:
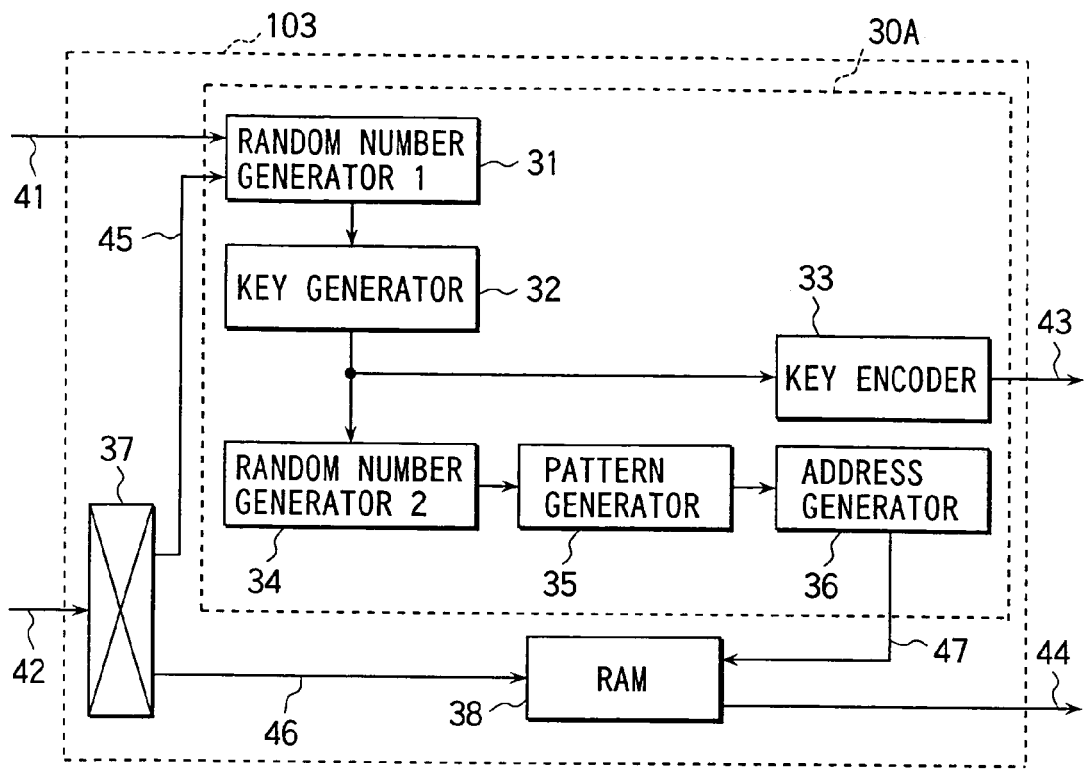
FIG. 7 is a block diagram of a scrambler shown in FIGS. 1, 2, and 5.

FIG. 7 is a block diagram showing an example of the arrangement of the scrambler 103 shown in FIGS. 1, 2, and 5. The scrambler shown in FIG. 7 receives a seed 41 for a random number generator, and a video signal 42, and outputs a scrambled video signal 44 and descramble key 43. The input video signal 42 is temporarily stored in a picture memory 38, and a sync signal 45 demultiplexed from the input video signal 42 by a demultiplexer 37 is input to a scramble pattern generator 30A.

The scramble pattern generator 30A generates a readout address 47 of the picture memory (RAM) 38 in correspondence with the seed 41 for the random number generator 104. When a video signal is read out from the picture memory 38 in accordance with the generated readout address 47, the scrambled video signal 44 is output from the scrambler 103.

In the scramble pattern generator 30A, the seed 41 is input to a first random number generator 31, and a descramble key generator 32 generates a descramble key on the basis of a random number generated by the random number generator 31. The generated descramble key is input to a second random number generator 34, and a scramble pattern generator 35 generates a scramble pattern determined according to a random number generated by the random number generator 34.

An address generator 36 generates the readout address 47 of the picture memory 38 on the basis of the scramble pattern from the scramble pattern generator 35, thus reading out picture data. The descramble key generated by the descramble key generator 32 is coded by a key encoder 33, and is output as the descramble key 43.

Assume that the algorithms of the building components of the scramble pattern generator 30A and the value of the seed 41 for the first random number generator 31 are not disclosed. Also, of the building components of the scramble pattern generator 30A, the seed 41 for the first random number generator 31 and the algorithms of the first random number generator 31 and descramble key generator 32 are inherent to each video coding system and are independently installed in each video coding system.

On the other hand, assume that the algorithms of the second random number generator 34, scramble pattern generator 35, and descramble key encoder 33 are shared between the video coding system and the corresponding video decoding system and their contents are not disclosed.

Figure 8:
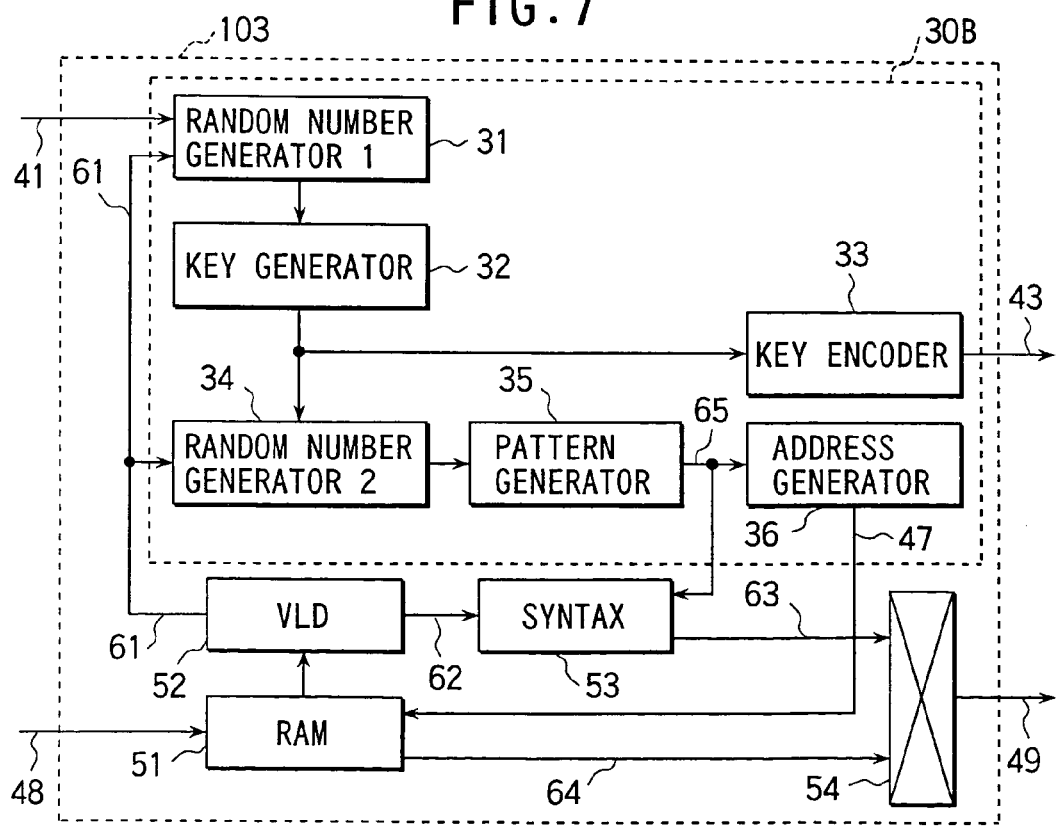
FIG. 8 is a block diagram of a scrambler shown in FIGS. 3, 4, and 6.

FIG. 8 shows an example of the arrangement of the scrambler 103 shown in FIGS. 3, 4, and 6. The arrangement of a scramble pattern generator 30B in FIG. 8 is functionally the same as that of the scramble pattern generator 30A in FIG. 7. Referring to FIG. 8, coded video data 48 and a seed 41 for a first random number generator 31 are input, and scrambled coded data 49 and a descramble key 43 are output from the scrambler 103.

The coded video data 48 is temporarily stored in a memory 51, and undergoes syntax parsing by a variable length decoder 52. The variable length decoder 52 outputs a sync signal 61 to the scramble pattern generator 30B in synchronism with a given position such as a boundary of a frame or macroblock.

The scramble pattern generator 30B generates a scramble pattern 65 in accordance with the seed 41 for the first random number generator 31 and in synchronism with the sync signal 61 input from the variable length decoder 52 as in the scrambler shown in FIG. 7, thus generating a readout address 47 of the coded video data stored in the memory 51.

A syntax generator 53 corrects coded data that pertains to a motion vector of the coded data in accordance with the coded data analyzed by the variable length decoder 52 and the scramble pattern 65 generated by the scramble pattern generator 30B. More specifically, motion vector data is corrected by adding an offset to the horizontal or vertical component of a motion vector in correspondence with the moving amount of the macroblock position upon replacing slices or macroblocks in a frame so as to variable-length code the motion vector again.

A multiplexer 54 multiplexes coded data 64 read out from the picture memory 51 in accordance with the readout address 47 for video data, which is generated in correspondence with the scramble pattern 65, and coded data 63 obtained by correcting some coded data by the syntax generator 53, and outputs the multiplexed data as the scrambled coded data 49.

When coded video data obtained by coding a video signal scrambled by the scrambler shown in FIG. 7, and data obtained by scrambling coded video data, which is coded without scrambling, by the scrambler shown in FIG. 8 on the coded data level are decoded and displayed by the video decoding system, identical scrambled reconstructed pictures are obtained as long as the same scramble pattern is used. More specifically, using the scrambler shown in FIG. 8, processes equivalent to scrambling of an input video signal before coding can be implemented by scrambling coded video data.

The arrangement of a descrambler for a video signal in the embodiments of the present invention will be explained below.

Figure 9:
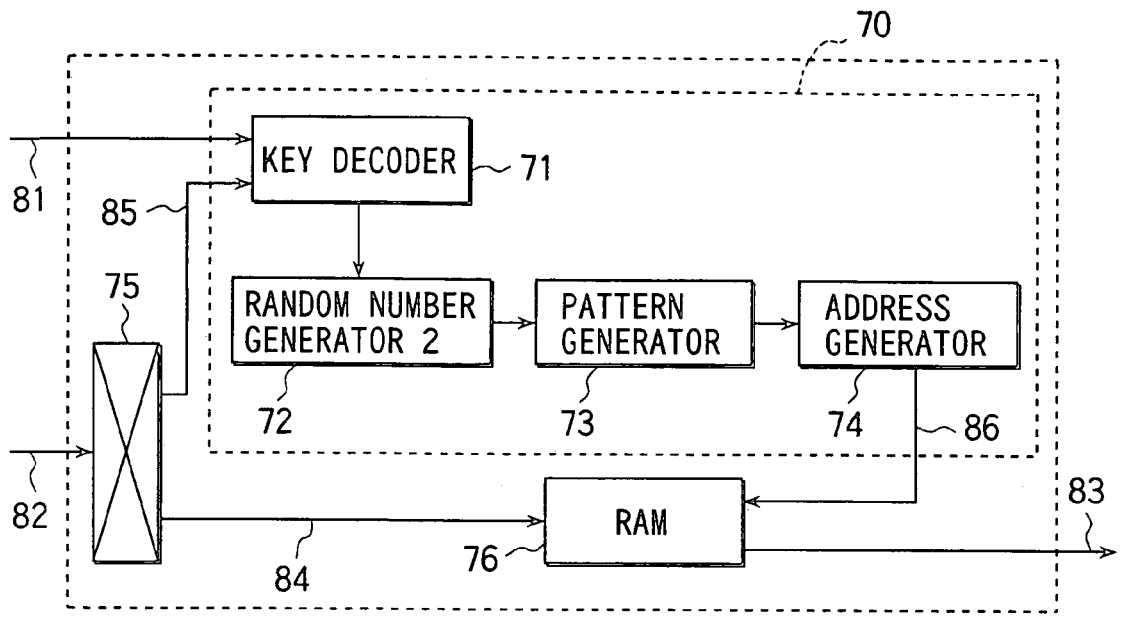
FIG. 9 is a block diagram of a descrambler shown in FIGS. 1 to 6.

FIG. 9 shows an example of the arrangement of the descrambler 202 shown in FIGS. 1 to 7. This descrambler receives a digital watermark or an externally input coded scramble key 81 in the video decoding system, and a decoded video signal 82, and outputs a descrambled video signal 83. The input video signal 82 is scrambled one and as such unfit for appreciation. The scrambled input video signal 82 is temporarily stored in a picture memory 76 as a picture signal 84 via a demultiplexer 75, and a sync signal 85 demultiplexed from the input video signal 82 by the demultiplexer 75 is input to a scramble pattern reconstruction section 70.

The scramble pattern reconstruction section 70 receives the coded scramble key 81 together with the sync signal 85. The coded scramble key 81 is decoded by a key decoder 71. A random number generator 72 generates a random number in accordance with the decoded scramble key, and a scramble pattern generator 73 reconstructs a scramble pattern on the basis of this random number. An address generator 74 calculates the readout address of the picture memory 76 on the basis of the reconstructed scramble pattern, and the video signal is read out from the picture memory 76 in accordance with the calculated address, thus outputting a descrambled video signal 83.

Assume that the algorithms of the key decoder 71, random number generator 72, and scramble pattern generator 73 in the scramble pattern reconstruction section 70 of this descrambler are not disclosed. Also, as these algorithms, the same algorithms as those in the scrambler are shared.

The method of coding motion vectors used in MPEG2 video coding in the video encoder 108 in the first to sixth embodiments will be described below with reference to FIG. 11.

In MPEG2 video coding, the difference between the motion vector of a macroblock to be coded, and the motion vector of a neighboring macroblock on the left side of the macroblock to be coded is calculated, and that difference vector is coded using a variable-length code. However, (1) at the head position of a slice and (2) immediately after an intra-macroblock having no vector information, not the difference vector but the motion vector of the macroblock to be coded is coded.

Figure 11:
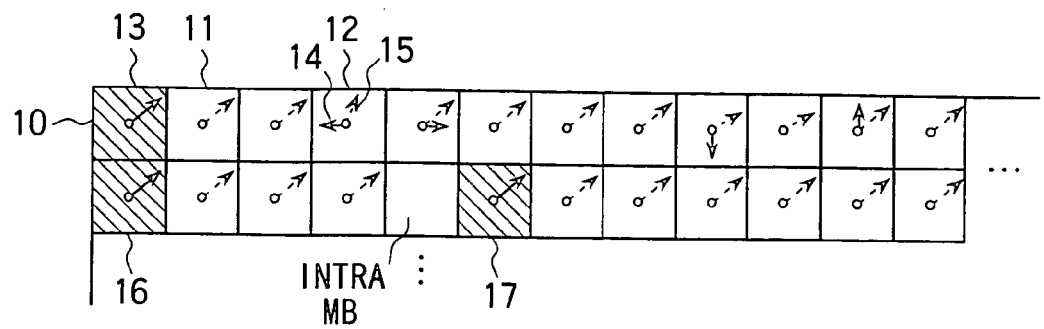
FIG. 11 is a view for explaining a method of coding motion vector data in MPEG2 coding.

Referring to FIG. 11, reference numerals 10, 11, and the like denote macroblocks in a frame, and the dotted arrows (e.g., an arrow 15) indicate motion vectors detected in units of macroblocks. The difference between each of such motion vectors, and the motion vector of its neighboring macroblock is indicated by a solid arrow (e.g., an arrow 14), and this value is coded. When motion vectors between neighboring macroblocks match each other, motion vector components to be coded are (0, 0). However, since motion vectors 13 and 16 are located at the head positions of slices, and a motion vector 17 is located immediately after an intra-macroblock, differences are not calculated for these motion vectors, and the motion vectors themselves are coded.

The variable-length code of each motion vector is coded by a combination of a code field having a fixed length in each macroblock in a frame, and a code field having a variable length in units of macroblocks in correspondence with the maximum value of motion vectors in the frame. In either field, the code length becomes smaller as the motion vector component assumes a smaller value. That is, the number of coded bits of a motion vector is determined depending on the maximum value of motion vectors in a frame, and the degree of correlation between the motion vectors of neighboring macroblocks.

The video scramble apparatus according to the present invention can prevent motion compensation predictive efficiency from lowering, and can avoid coding efficiency drop prevented upon DPCM coding of the DC components of DCT coefficients and upon variable-length coding of AC components thereof by scrambling only frames which are not used as a reference picture, and inhibiting scrambling on levels smaller than a macroblock as a coding unit. However, the number of coded bits of a motion vector increases due to an increase in motion vector size upon replacing slices or macroblocks or due to an increase in motion vector difference between neighboring macroblocks. However, according to the video scramble apparatus of the present invention, an increase in the number of coded bits of motion vector data can be minimized.

Examples of video scramble methods executed in the scramblers 103 of the first to sixth embodiments will be explained below as the seventh to 11th embodiments of the present invention. FIGS. 12A to 16B show scramble methods upon replacing slices or a plurality of macroblocks in a frame according to the present invention.

Figure 12A:
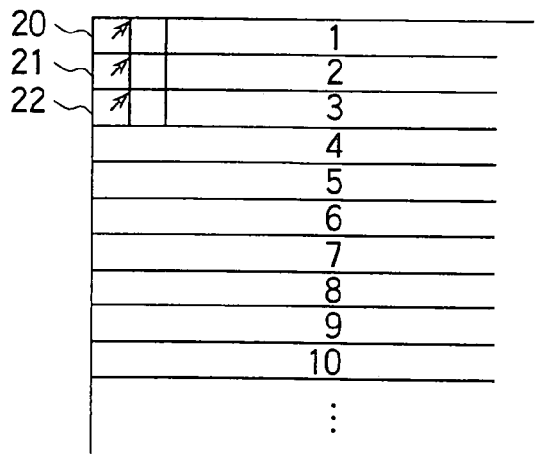
FIGS. 12A and 12B are views for explaining a video scramble method according to the seventh embodiment of the present invention.
Figure 12B:
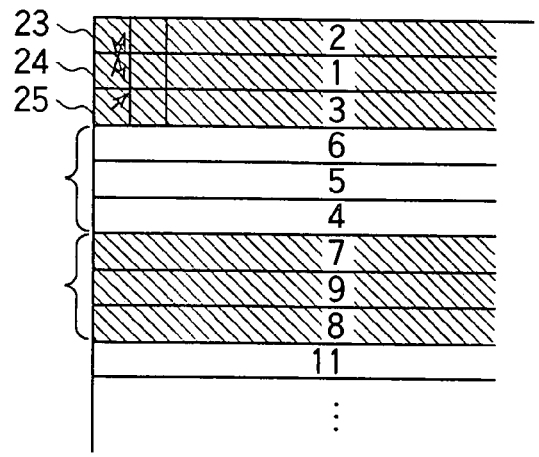

FIGS. 12A and 12B show a video scramble method according to the seventh embodiment of the present invention. FIGS. 12A and 12B show an example of replacing in units of slices in the vertical direction. Referring to FIGS. 12A and 12B, reference numerals 1, 2, and 3 denote slices. FIG. 12A shows the slice positions of a frame before scrambling, and FIG. 12B shows the slice positions of the frame after scrambling. In the example shown in FIGS. 12A and 12B, the order of three slices is randomly replaced in units of three consecutive slices.

As for three slices of screen information in FIGS. 12A and 12B, the order of slices 1, 2, and 3 is changed to 2, 1, and 3. In FIG. 12A, the motion vectors of macroblocks at the head positions of the slices are indicated by arrows. In order to realize the reference relationship of motion compensation prediction in units of macroblocks as in FIG. 12B in a scrambled picture shown in FIG. 12A, offsets corresponding to replacement of slices must be added to the vertical components of motion vectors of the respective macroblocks. For example, negative offsets corresponding to the number of lines per slice must be added to the vertical components of motion vectors in the respective macroblocks of slice 1, and positive offsets corresponding to the number of lines per slice must be added to the vertical components of motion vectors in the respective macroblocks of slice 2.

As for macroblocks which are coded by coding difference vectors with neighboring macroblocks in the slice, since the offset to be added to the motion vectors in the slice is constant, no offset need be added to the difference vectors. That is, the number of coded bits of motion vector data upon scrambling increases in only a macroblock located at the head position of each slice and a macroblock located immediately after an intra-macroblock, and the increase can be minimized.

Since the number of slices to be replaced is limited to three, an increase in maximum value of motion vectors can be only the number of lines corresponding to two slice widths at maximum, and an increase in the number of coded bits of motion vector data can also be suppressed. Even in the descrambler, descrambling can be implemented by only a memory size corresponding to two slices. More specifically, since the replacing range of slices in the vertical direction is limited to a predetermined range (three slices in this case) and replacement is done within this range, any large increase in the number of coded bits of motion vector can be suppressed compared to a case wherein slices are randomly replaced in the entire frame, thus minimizing deterioration of image quality due to coding efficiency drop. Also, the picture memory size required in the descrambler can be greatly reduced.

Figure 13:
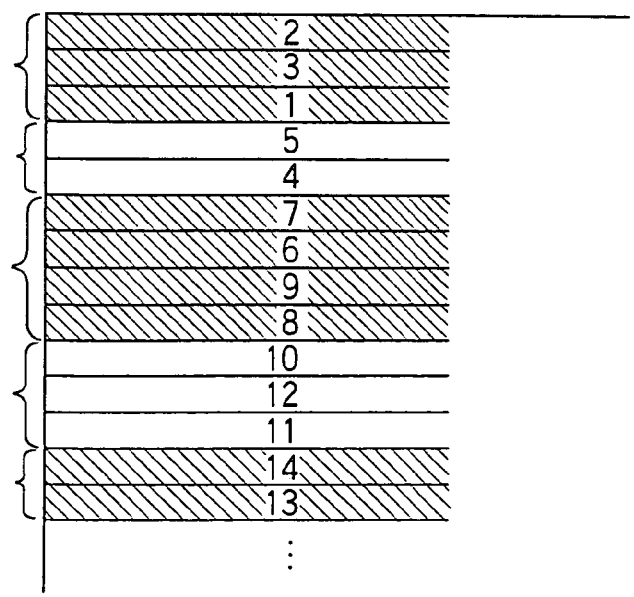
FIG. 13 is a view for explaining a video scramble method according to the eighth embodiment of the present invention.

FIG. 13 shows an example of a video scramble method according to the eighth embodiment of the present invention. FIG. 13 shows an example wherein replacement is done in the vertical direction using slice units different from those in FIGS. 12A and 12B. In the example shown in FIG. 13, the maximum value (four in this case) of a predetermined number of slices to be replaced is determined, and slices are randomly replaced in units of slices, the number of which is equal to or smaller than the maximum value. In FIG. 13, the slice replacing ranges respectively include three, two, four, three, and two slices from the upper end in the frame, and slices are replaced within these ranges. Each slice replacing range is randomly determined to include a predetermined number or less of slices. In this manner, the number of scramble patterns can be increased, and resilience against unauthorized attacks to scrambling can be strengthened.

Figures 14A, 14B, 15A, 15B:
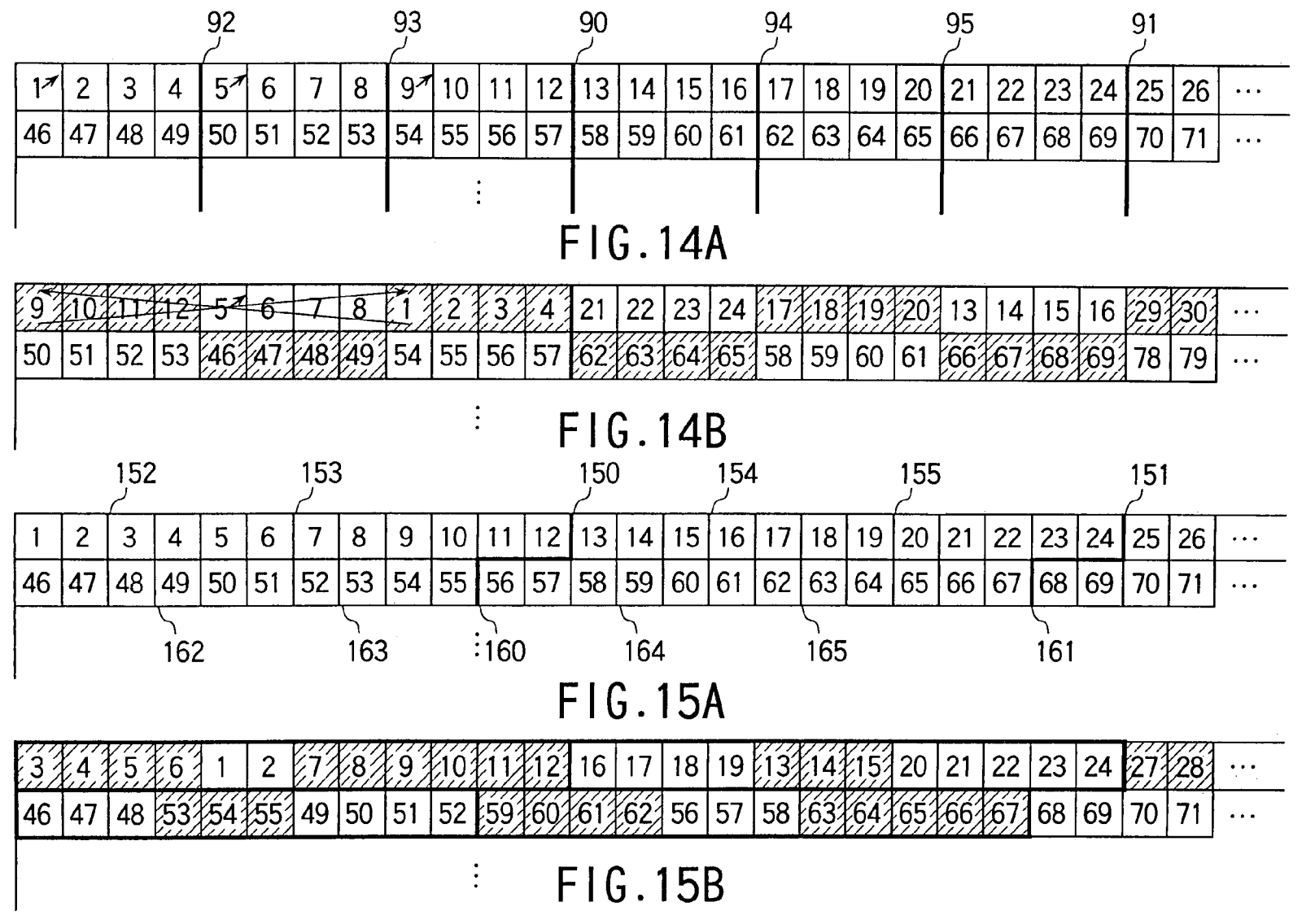

FIGS. 14A and 14B show an example of a video scramble method according to the ninth embodiment of the present invention. FIGS. 14A and 14B exemplify a case wherein scrambling is implemented by replacing macroblocks within a slice. FIG. 14A shows the macroblock positions in an original picture frame, and FIG. 14B shows the layout of macroblocks after scrambling.

In FIGS. 14A and 14B, first cut points (90, 91) are set in units of 12 consecutive macroblocks in a slice, and second cut points (92, 93, 94, 95) are set in units of four consecutive macroblocks. Macroblocks are randomly replaced in the horizontal direction in units of four consecutive macroblocks divided at the second cut points in each of regions divided by the first cut points, thus attaining scrambling. The replacing pattern changes in units of regions divided at the first cut points.

In the example shown in FIGS. 14A and 14B, macroblocks 1 to 4 are located at the positions of macroblocks 9 to 12, the positions of macroblocks 5 to 8 remain the same, and macroblocks 9 to 12 are located at the positions of macroblocks 1 to 4. Upon replacing macroblocks, offsets corresponding to replacing amounts are added to the horizontal components of motion vectors.

When motion vectors indicated by arrows in FIG. 14A are detected from macroblocks 1, 5, and 9, horizontal offsets each corresponding to the four macroblock widths are added to or subtracted from motion vectors after scrambling of macroblocks 9 and 1, as shown in FIG. 14B. Likewise, an identical offset is added to the horizontal components of motion vectors of all macroblocks contained in each of regions divided at the second cut points.

However, since the difference value between the motion vectors of neighboring macroblocks is coded, no offset is added to the difference vector value to be coded except for the head macroblock in each of regions divided at the second cut points. Hence, the number of bits of motion vector data of the head macroblock at the second cut point slightly increases, but other macroblocks suffer hardly any increases in the number of coded bits of motion vector data.

Also, an increase in the number of coded bits of motion vector data due to an increase in maximum value of motion vectors in a frame can also be suppressed, since the increase in motion vector size is limited by the width between neighboring first cut points.

FIGS. 15A and 15B show an example of a video scramble method according to the 10th embodiment of the present invention. In FIGS. 15A and 15B, upon replacing macroblocks in a slice, the maximum value between neighboring first cut points, and that between neighboring second cut points are prescribed, first points are set at random spacings equal to or smaller than that prescribed value, second cut points are set at random spacings equal to or smaller than the prescribed value within each of regions divided by the first cut points, and macroblocks are replaced in units of consecutive macroblocks divided at the second points in each of the regions cut at the first cut points. In the example shown in FIGS. 15A and 15B, the maximum value of the width between neighboring first cut points is set at 12 macroblocks, and that between neighboring second cut points are set at 6 macroblocks. The first and second cut points are also changed in units of slices.

In the uppermost slice in a frame, reference numerals 150 and 151 denote first cut points; and 152, 153, 154, and 155 denote second cut points. In the second uppermost slice, reference numerals 160 and 161 denote first cut points; and 162, 163, 164, and 165 denote second cut points. The replacing pattern of regions divided at the second cut points in each of regions divided at the first cut points is randomly set in units of regions divided at the first cut points.

With the aforementioned processes, a scramble pattern which can suppress an increase in motion vector, allows a large number of combinations, and is robust against unauthorized attacks can be generated.

FIGS. 16A and 16B show an example of a video scramble method according to the 11th embodiment of the present invention. In FIGS. 16A and 16B, slice replacing in the vertical direction shown in FIGS. 12A and 12B or FIG. 13 is done in addition to macroblock replacing in the horizontal direction shown in FIGS. 15A and 15B.

In this manner, by combining the scramble method which is implemented by replacement of macroblocks in the horizontal direction, and can suppress coding efficiency drop, and the scramble method which is implemented by replacement of slices in the vertical direction, an effect of making a picture be hard to recognize by scrambling can be improved with hardly any deterioration of image quality of the reconstructed picture. Also, since the number of combinations of scramble patterns can be further increased, resilience against unauthorized attacks can be improved.

To restate, according to the present invention, a frame which is not used as a reference picture at the coding side is selected, and is scrambled by replacing pixels in units of slices within a predetermined vertical range or in units of n consecutive macroblocks. In this manner, intraframe correlation and interframe correlation used in coding are prevented from being lost, and any increase in the number of coded bits of motion vector data can be suppressed. As a result, a video signal can be scrambled without any drop of coding efficiency. On the other hand, since a video signal obtained by decoding is descrambled at the decoding side, a normal picture can be played back.

Therefore, when the video scramble apparatus according to the present invention is used, a more robust unauthorized duplication prevention system and a safer video billing system can be implemented without any deterioration of image quality in a video transmission system using coding such as MPEG2 or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A video processing apparatus for an input video signal, comprising:
 a random number generator to generate scramble key information concerning a previous video picture and used for descramble;
 a watermark generator to generate a watermark signal including the scramble key information concerning the previous video picture;
 a multiplexer to multiplex the watermark signal on the input video signal to generate a multiplexed signal including the scramble key information;
 an encoder to encode the multiplexed signal to output encoded video data including the scramble key information; and
 a scrambler to scramble the encoded video data to output scrambled video data including the scramble key information to be used for descramble.

2. The video processing apparatus according to claim 1, further comprising a descrambler to descramble the scrambled video data using the scramble key information concerning the previous video picture to generate a descrambled video signal.

3. A video processing apparatus for an input video signal, comprising:
 means for generating scramble key information concerning a previous video picture and used for descramble;
 means for generating a watermark signal including the scramble key information concerning the previous video picture;
 means for multiplexing the watermark signal on the input video signal to generate a multiplexed signal including the scramble key information;
 means for encoding the multiplexed signal to output encoded video data including the scramble key information; and
 means for scrambling the encoded video data to output scrambled video data including the scramble key information to be used for descramble.

4. The video processing apparatus according to claim 3, further comprising means for descrambling the scrambled video data using the scramble key information concerning the previous video picture to generate a descrambled video signal.

5. A video processing method for an input video signal, comprising:
 generating scramble key information concerning a previous video picture and used for descramble;
 generating a watermark signal including the scramble key information concerning the previous video picture;
 multiplexing the watermark signal on the input video signal to generate a multiplexed signal including the scramble key information;
 encoding the multiplexed signal to output encoded video data including the scramble key information; and
 scrambling the encoded video data to generate scrambled video data including the scramble key information to be used for descramble.

6. The video processing method according to claim 5, further comprising means for descrambling the scrambled video data using the scramble key information concerning the previous video picture to generate a descrambled video signal.

* * * * *